(12) United States Patent
Blaszczykiewicz (10) Patent No.: US 11,958,262 B2
(45) Date of Patent: *Apr. 16, 2024

(54) CERMET TOOLING WITH A PLASTIC SUPPORT STRUCTURE

(71) Applicant: Thomas Blaszczykiewicz, Orchard Park, NY (US)

(72) Inventor: Thomas Blaszczykiewicz, Orchard Park, NY (US)

(73) Assignee: Innex Innovative Industries, Rochester, NY (US)

(*) Notice: Subject to any disclaimer, the term of this patent is extended or adjusted under 35 U.S.C. 154(b) by 1017 days.

This patent is subject to a terminal disclaimer.

(21) Appl. No.: 16/832,316

(22) Filed: Mar. 27, 2020

(65) Prior Publication Data

US 2020/0307136 A1    Oct. 1, 2020

Related U.S. Application Data

(63) Continuation-in-part of application No. 16/712,082, filed on Dec. 12, 2019, now Pat. No. 11,225,704.

(Continued)

(51) Int. Cl.
*B30B 11/02* (2006.01)
*B30B 15/00* (2006.01)
(Continued)

(52) U.S. Cl.
CPC ............ *B30B 11/02* (2013.01); *B30B 15/00* (2013.01); *C08K 3/013* (2018.01);
(Continued)

(58) Field of Classification Search
CPC ... H01F 1/37; H01F 1/28; B30B 15/00; B30B 15/065; B30B 11/02; C08K 2201/01;
(Continued)

(56) References Cited

U.S. PATENT DOCUMENTS 3,502,584 A    3/1970 Denes
3,762,919 A    10/1973 Daniels
(Continued)

FOREIGN PATENT DOCUMENTS

CN    201582100    9/2010
JP    2007180289    7/2007

*Primary Examiner* — Matthew E. Hoban
*Assistant Examiner* — Lynne Edmondson
(74) *Attorney, Agent, or Firm* — David E. Novak; Brannon Sowers & Cracraft PC (57) ABSTRACT

A tooling assembly, including a cermet tooling body and a plastic support structure operationally connected to the cermet tooling body. The plastic support structure at least partially encapsulates the cermet tooling body. The plastic support structure includes a plastic matrix portion and a plurality of high magnetic permeability metallic particles distributed throughout the plastic matrix portion. Each respective high magnetic permeability metallic particle has a magnetic permeability of at least 0.0001 H/m and each respective high magnetic permeability metallic particle has a relative magnetic permeability of about 8000. The plastic matrix portion is selected from the group consisting of high molecular mass polymers, thermoplastics, thermosetting polymers, amorphous plastics, crystalline plastics, resin-based materials, and combinations thereof.

9 Claims, 6 Drawing Sheets

Related U.S. Application Data (60) Provisional application No. 62/825,094, filed on Mar. 28, 2019.

(51) Int. Cl.
*C08K 3/013* (2018.01)
*F16J 1/01* (2006.01)

(52) U.S. Cl.
CPC .............. *C08K 2201/01* (2013.01); *F16J 1/01* (2013.01); *Y10T 29/49945* (2015.01)

(58) Field of Classification Search
CPC .... C22C 2204/00; B23B 2222/16; F16J 1/01; Y10T 29/49945; Y10T 428/1321
See application file for complete search history.

(56) References Cited

U.S. PATENT DOCUMENTS

| | | |
|---|---|---|
| 3,901,717 A | 8/1975 | Revaz |
| 4,606,767 A | 8/1986 | Nagato |
| 4,624,884 A | 11/1986 | Harada |
| 4,898,699 A | 2/1990 | Hofmann |
| 4,955,953 A | 9/1990 | Kayser |
| 5,090,500 A | 2/1992 | Yousef |
| 5,186,854 A | 2/1993 | Edelstein |
| 5,624,542 A | 4/1997 | Shen |
| 5,708,956 A | 1/1998 | Dunmead |
| 5,985,461 A | 11/1999 | Tani |
| 5,993,511 A | 11/1999 | Piro |
| 6,245,439 B1 | 6/2001 | Yamada |
| 6,982,378 B2 | 1/2006 | Dickson |
| 7,030,828 B2 | 4/2006 | Kato |
| 7,214,046 B2 | 5/2007 | Gakovic |
| 7,485,366 B2 | 2/2009 | Ma |
| 7,740,814 B2 | 6/2010 | Westin |
| 11,225,704 B2 * | 1/2022 | Blaszczykiewicz ...... B22F 7/06 |
| 2003/0050707 A1 | 3/2003 | Landingham |
| 2005/0072269 A1 | 4/2005 | Banerjee |
| 2005/0236407 A1 | 10/2005 | Aisenbrey |
| 2007/0205529 A1 | 9/2007 | May |
| 2010/0038142 A1 | 2/2010 | Snyder |
| 2014/0162864 A1 | 6/2014 | Hall |

* cited by examiner

CERMET TOOLING WITH A PLASTIC SUPPORT STRUCTURE

CROSS-REFERENCE TO RELATED APPLICATIONS

This patent application claims priority to U.S. provisional patent application Ser. No. 62/825,094, filed on Mar. 28, 2019, and to is a continuation-in-part of, and claims priority to, co-pending U.S. patent application Ser. No. 16/712,082, filed on Dec. 12, 2019.

TECHNICAL FIELD

The novel technology disclosed herein relates generally to the field of ceramic materials and, more particularly, to a theoretically dense sintered ceramic tooling body that exhibits strong paramagnetic and/or ferromagnetic properties as supported in a typically metal-detectible plastic support structure.

BACKGROUND

Tooling involved in the production of food and pharmaceuticals is typically metallic. Although ceramic materials have superior compressive properties, they are brittle and tend to chip. Thus, ceramic tooling is considered unsuitable for use with food and/or pharmaceuticals, since ceramic chips or fragments are difficult to detect and can contaminate the foodstuffs and/or pharmaceutical materials. Thus, there remains a need for ceramic tooling enjoying superior compression strengths along with easy detection of chips and fragments for screening and removal. The present novel technology addresses this need.

One tool of particular utility in the pharmaceutical industry is the compaction die. The compaction die is is an isostatic pressing device utilized in the production of tablets utilized in, and not limited to, the following industries: battery, pharmaceuticals, nutraceuticals, cosmetics, confectionary, food, pet food, chlorine and industrial tablets. Such dies are commonly used on tablet presses and the like to compact powders into green bodies so as to produce tablets or other compacted shapes.

Thus, there remains a need for ceramic tooling enjoying superior compression strengths along with easy detection of chips and fragments for screening and removal. The present novel technology addresses this need.

BRIEF DESCRIPTION OF THE DRAWINGS

FIG. a is a perspective view of a prior art piston assembly supported in a metal belt.

DETAILED DESCRIPTION

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

The present novel technology relates to ceramic or cermet compositions that may be formed into sintered and densified ceramic bodies that enjoy the physical toughness, strength and wear resistance of ceramics while being detectible by conventional metal detection techniques. These cermet compositions may then be formed into such bodies as metal-detectible ceramic tooling or the like, thus offering improved safety features by increased ability to detect any small contaminate.

In one embodiment, the cermet composition includes a ceramic matrix phase such as $ZrO_2$, yttria stabilized zirconia (YSZ), $Gd_2O_3$, BC, alumina, and combinations thereof, with a metallic phase such as Ni, Fe, Co, permalloy, Mu-metal, and combinations thereof, dispersed therein. The metallic phase is typically introduced in oxide form for reduction to metallic form during processing, to avoid mixing issues arising from significant density differences as well as metallic species chemically interacting with oxide species at elevated temperatures. Alternately, some or all of the metallic phase component may be introduced as metallic species.

The metallic phase may be an alloy, and the alloy may be introduced as metal alloy particles, particles of oxidized alloy, or as oxides of the constituent metals for reduction and subsequent alloying of the resulting metals. The metallic phase typically has a high magnetic permeability $\mu$ of at least about $1 \times 10^{-4}$ H/m, more typically $\mu$ being at least about $1 \times 10^{-3}$ H/m, still more typically $\mu$ being at least about $1 \times 10^{-2}$ H/m, and yet more typically $\mu$ being about $5 \times 10^{-2}$ H/m. The metallic phase typically has a relative permeability $\mu/\mu_0$ of at least about 100, more typically at least about 1000, still more typically of at least about 10,000, and yet more typically of at least about 20,000, and in some cases, $\mu/\mu_0$ may exceed 50,000 or more.

In some specific examples, the metallic phase typically has a high magnetic permeability $\mu$ of at least about $1 \times 10^{-4}$ H/m with a relative permeability $\mu/\mu_0$ of at least about 100, more typically $\mu$ being at least about $5 \times 10^{-3}$ H/m and $\mu/\mu_0$ at least about 4000, still more typically $\mu$ being at least about $1 \times 10^{-2}$ H/m and $\mu/\mu_0$ at least about 8000, and yet more typically $\mu$ being about $2.5 \times 10^{-2}$ H/m and $\mu/\mu_0$ 20,000. In some cases, $\mu/\mu_0$ may exceed 50,000 or more.

Typically, the matrix and metallic phase materials are provided as precursor powders, more typically as a homogeneous admixture, with the metallic phase present in sufficient quantity to yield between about 1 volume percent and about 20 volume percent metallic particles to the resultant cermet body, with about 80 to about 99 volume percent of the powder giving rise to the ceramic matrix phase, and with about 1 to about 8 weight percent of organic additives. A typical composition has less than 10 volume percent of the powder that gives rise to the metallic phase, with the balance being given to the powder giving rise to the ceramic matrix phase and, optionally a small amount of organic additives. If the powder giving rise to the metallic phase is a reducible material (e.g., a metal oxide), the volume percent of initial precursor powder is typically appropriately adjusted to compensate for the loss of the species (e.g., oxygen) that is removed during firing in a reducing atmosphere.

Typically, the matrix phase is a stable, structural ceramic, such as $ZrO_2$, yttria stabilized zirconia (YSZ), $Gd_2O_3$, BC, alumina, or the like, and may include such materials as the various stabilized zirconias, zirconia-toughened alumina, alumina, $TiB_2$, $ZrB_2$, $HfB_2$, $TaB_2$, TiC, $Cr_3C_2$, and the like, and mixtures thereof.

The cermet composition may be prepared by any process that yields a monolithic part, typically having a well-blended mixture of the ceramic matrix phase and the oxide precursor phase, that will yield the metallic phase upon firing in a reducing environment. This may include preparation by slip casting, extrusion, freezing, and the like. One typically selected method is dry pressing, such as uniaxial pressing, cold isostatic pressing, hot isostatic pressing, and the like.

The appropriate powder preparation method is dictated by the selected method for processing the cermet composition. Dry pressing the powder giving rise to the ceramic matrix phase and the powder giving rise to the metallic phase are homogenized through mixing/blending to define an admixture. Additionally, organic additives such as surfactants, binders and the like may be present in small amounts to aid in powder processing, green body formation, and the like. Typically, these organic additives may be dissolved in a suitable liquid to be gradually added to the mixed inorganic powders in a shear granulation process. One typical powder preparation method includes preparing a suspension of the mixed inorganic powders and organic additives for drying to yield press ready granules.

In the case of an oxide powder precursor for yielding a metal alloy phase (i.e., a metal consisting of more than one element), it is preferred that the multiple oxide powders be calcined together at suitably high temperatures to generate a multi-elemental reaction product that is subsequently milled to a particle size that is appropriate for subsequent powder processing. Alternatively, predetermined amounts of constituent metals may be mixed and fused, with the fusion product allow later milled into a metallic powder precursor to yield an admixture.

The homogeneous admixture is then formed into a green body. Typically, the admixture is introduced into a mold and pressed into a green body. In some embodiments, small amounts of binder are introduced to assist the green body in retaining its shape after formation. The green body is then sintered at elevated temperatures and under controlled, reducing atmospheric compositions. A majority of the non-matrix metal oxide portion is reduced to yield a sintered cermet body having a predetermined amount of metallic particles dispersed in a sintered ceramic, typically oxide, matrix. In some instances, the admixture is introduced into a mold and then formed directly into a sintered cermet body, such as through a hot isostatic pressing (HIP) technique.

Generally, the admixture is heated at one to ten degrees Celsius per minute until a peak temperature between 1400 and 1700 degrees Celsius is reached. Then the admixture is held at this peak temperature for no greater than four hours. This is followed by a cool down by decreasing the temperature of the admixture between one to 5 degrees Celsius per minute until a temperature between 1200 and 1400 degrees Celsius is reached. The admixture is to dwell in this temperature range for duration of one to six hours. Then the admixture is to be brought down to room temperature at a rate of one to ten degrees Celsius per minute. The admixture may be processed in powder form, or as pressed into body. The metal particle size and distribution is influenced by the firing time and temperature. For example, longer firing times and/or greater firing temperatures typically yield larger metallic particles.

Once a sintered body is produced, it may be further machined into a desired shape. Further, the sintered body, before and/or after machining, may be soaked at an elevated temperature in a reducing atmosphere, such as annealing in hydrogen, to improve its ability to be sensed by a metal detector. Other generally appropriate reducing atmospheres may include a forming gas (i.e., hydrogen blended with one or more inert or noble gas at various ratios), ammonia, vacuum, and combinations of the like.

In one embodiment, the green body is chemically activated to yield a densified ceramic matrix having a plurality of metallic particles dispersed therethrough.

In one embodiment, the sintered, densified cermet bodies are formed as pill-making tooling. The pill-making tooling enjoys the benefits of ceramic composition, including compression strength, toughness, durability, corrosion resistance, low coefficient of friction, low thermal expansion coefficient, and the like. The tooling enjoys the advantages of the advanced ceramic with the additional ability of being identified by conventional metal detection technology.

Other embodiments of the sintered, densified cermet bodies include equipment and tooling for the processing of foods and beverages, for pharmaceutical manufacture and processing, medical diagnostic devices and tools, military hardware, weapons, metal blades and cutting tools, industrial tooling and machinery, punches and dies, and the like.

In operation, tooling made from the novel cermet material functions similarly to traditional metal tooling, with the exception of typically requiring less lubricant and maintenance. This is advantageous for tooling associated with the production of pharmaceuticals and foodstuffs, such as pills, vitamins, and the like, as there is an associated reduction of discoloration (i.e., black marks) of the final product. Further, the novel cermet tooling is typically formed as a single piece, as contrasted to traditional multipiece tooling (i.e., metal punch having a ceramic tip), and thus the incidence of attached tooling pieces becoming dislodged during use is eliminated.

Typically, a production line utilizing the novel cermet tooling will have metal detectors for detecting and screening tooling chips from product. Typically, metal detectors employ an electric generator for producing an alternating electric field and a magnetometer for detecting magnetic fields. The electric generator produces an alternating electric field which generates eddy currents in electrically conductive materials; the eddy currents give rise to magnetic fields, which may be detected by the magnetometer. The tooling chip contaminants contain electrically conductive metallic particles which react to the magnetometer. Chips are thus removed from product upon detection. In some embodiments, the novel cermet material is sufficiently ferromagnetic as to be magnetically sortable from nonmagnetic product. Further, the novel cermet is advantageous in that, with the proper selection of alloy having high magnetic permeability, it has an ability to be detected at smaller sized particles than ferrous tool steel. For the given magnetic permeabilities of this material, as discussed above, tooling chips having diameters of 0.5 mm may be typically detected and magnetically or otherwise removed, and more typically chips having diameters of 0.3 mm may be detected and magnetically or otherwise removed.

Moreover, the cermet material is substantially harder and tougher than tool steel. In some embodiments, soft ferrite is used as a stabilizer, supplementing or replacing magnesia, yttria, or like compositions with soft ferrite and/or permalloy. This can be added to materials such as alumina, mullite, ZTA, or the like and toughen up the material and provide a low cost hard material with enhanced toughness. Likewise, SiC, graphite, or like other fibers and/or whiskers may be added to provide additional toughness and strength.

Thus the novel cermet allows for possible abrasion resistance of up to 4 to 5 times what is allowed by typical tool steel.

The following example is merely representative of the work that contributes to the teaching of the present novel article, and the novel material is not intended to be restricted by the following example.

Example 1

This example relates to a novel method of manufacturing the novel material starting with a Ni/Fe super alloy which is then ground up, milled and mixed with a zirconium ceramic powder to yield a slurry. Wherein the metallic alloy is present in generally sufficient quantities between typically between about 2 and about 8 weight percent of the total (more typically between about 0.5 and about 20 volume percent of resultant cermet body.) The slurry is then spray dried prior to yield a powder precursor, which may be formed into a green body for sintering.

Generally, the sintering steps occur in oxygen-free conditions and the ceramic composition may first be calcined by firing in an ambient atmosphere in order to generally remove any organic additives (binders, dispersants, etc.). Burnout is accomplished by slowly heating the ceramic material between the region of 300 to 400 degrees Celsius, then continuing to heat the composition until appropriate temperature (on the order of 900 to 1100° C.) to bisque fire the composition has been reached, thereby imparting some strength. The bisque fired composition can then be heated in a separate step, using the previously discussed heating profile ranges, under vacuum or a reducing atmosphere to convert the reducible component to a metal while simultaneously sintering the cermet.

Alternatively, the ceramic composition may be fired in a single cycle. The binder burnout portion of the cycle is typically performed in air. Typically, the firing atmosphere remains air until a temperature range of between about 900 and about 1100 degrees Celsius, at which point the firing atmosphere is purged of air and replaced with a reducing atmosphere (such as hydrogen, ammonia, or the like) or an inert atmosphere (such as argon, nitrogen, or the like). Typically, waiting until the temperature range of 900 to 1100 degrees Celsius reduces the likelihood of sequential reduction reactions of single metallic elements in a powder that is intended to give rise to a metal alloy phase. Thus, the atmosphere typically remains as a reducing atmosphere for the remainder of the firing cycle, including the cool down phase. The oxygen content of the sintering atmosphere may be determined by the amount and nature of the ferrite material portion of the cermet composition, if any. For some compositions, microwave sintering is the preferred sintering process.

Once the sintered body is produced, it is typically annealed in hydrogen or other appropriate reducing atmospheres to improve its ability to be sensed by a metal detector. The sintered body will typically have a density of substantially theoretical (in excess of 99 percent, more typically in excess of 99.9 percent dense), bulk density of about 6 g/cc, hardness of about 1100-1500 HV, flexural strength of about 200 kPSI, compressive strength of about 2000 kPSI, toughness of 12-14 MPa·m$^{1/2}$ (K1c), modulus of 210-230 GPa, and a relative permeability $\mu/\mu_0$ of about 1000.

FIGS. 1A-3 illustrate one embodiment of the present novel technology, a plunger piston assembly 10 typically utilized in pumps, motors or other systems that compress solids, fluids, or the like. The plunger piston assembly 10 generally includes a removable wear sleeve portion 30, a mandrel 40, a housing center 50, and a center pin 60. Previously, when all or part of the piston assembly 10 is worn due to significant compressive forces inherent in the compaction process, the worn part(s) of the piston assembly 10 is/are discarded and the worn components are replaced. The plunger piston assembly 10 allows for replacement of the components to quickly put the piston 10 back into service. This may be done multiple times before the piston assembly 10 has to be replaced with new parts. Therefore, the piston assembly 10 reduces the cost of raw materials, labor and transportation costs, as well as the amount of time the compaction machines are down for repair. The techniques described herein may be adapted to any of number of compaction tooling applications. In addition, the piston assembly 10 and replacement method may be used in other similar compaction embodiments to allow for the use and refurbishment of various materials, typically the ceramic sleeve 30, in high-friction environments. An advantage of the disclosed embodiments and methods is the reuse of a highly machined part instead of replacement of the same, wherein it is, only necessary to replace/refurbish the portion of the piston assembly 10 that is worn. As a result, the life of compaction tooling may be significantly increased and/or the cost of reworking and refurbishing the same may be reduced.

A piston/plunger assembly 10 generally contains a housing center 50, an elongated tubular body typically formed from a single piece of material, the body having a first end 53, a second end 55, an outer surface 57, and an inner surface 59 that defines a plunger receiving a center pin 60. The center pin 60, which is typically disposed inside the housing center 50, is typically made from a structural material, such as the mu-metal doped YSZ material described above, although various metals and possibly other materials, such as tool steel or pre-hardened steel, may be employed and generally includes a first component or a center pin base 63, which is a generally cylindrical component having an aperture 65 in the lower end 67 thereof for controlling the position of the center pin 60, and/or affixing the mandrel 40 to the center pin 60, a ceramic tip 71 that forms the wear surface of the center pin assembly 60. The ceramic tip 71 is attached to the center pin base 73 using a mandrel arbor 75, typically made from tool steel, pre-hardened steel, or the like. As illustrated, mandrel arbor 75 is generally cylindrical, but typically includes either a tapered head at an upper end 77 thereof mated with tapered hole in ceramic tip 71, or a square head mated with counterbored hole in ceramic tip 71, so as to provide a positive engagement between mandrel arbor 75 and the ceramic tip 71.

In the known art, the housing 50, center pin 60, and mandrel 40 were typically permanently affixed in a manner that individual components of the piston/plunger 20 could not be removed or replaced. The piston/plunger assembly 10 permits the quick replacement of any of the piston/plunger components (the mandrel 40, a housing center 50, and a center pin 60) at any time, without having to tear apart the pump, through the use of a removable sleeve 30. The removable wear sleeve portion 30 is typically made of a structural ceramic material such as wear resistant ceramic oxides, although any convenient material may be selected, and is generally shaped and sized to snugly fit the dimensions of a standard piston/plunger 20, although the removable wear sleeve 30 may be sized and adapted to fit any piston/plunger.

To assemble the plunger piston assembly 10, the center pin 60 is typically inserted into the removable wear sleeve 30. The housing center 50 is then attached to the center pin 60 and the mandrel 40 is then cinched down and connected to the center pin 60. This assembly 10 allows the piston/plunger 20 to be used until the piston/plunger is worn from use. Once the piston/plunger 20 is worn, the ceramic sleeve 30 may be removed by removing the mandrel 40 with a wrench, thus releasing the ceramic sleeve 30. A new ceramic sleeve 30 may then be placed onto the pre-existing mandrel 40 and cinched back onto the center pin 60. The use of such ceramic components enables reworking and replacement of the worn tool components. The easy to remove mandrel 40 allows for personnel in the field to easily remove the mandrel 40 and replace the worn ceramic or high wear sleeve 30 in the field. Alternatively, the plunger piston assembly 10 may be swapped out and sent back to the manufacturer to be refurbished and reused at a lower cost.

Figure 1A:
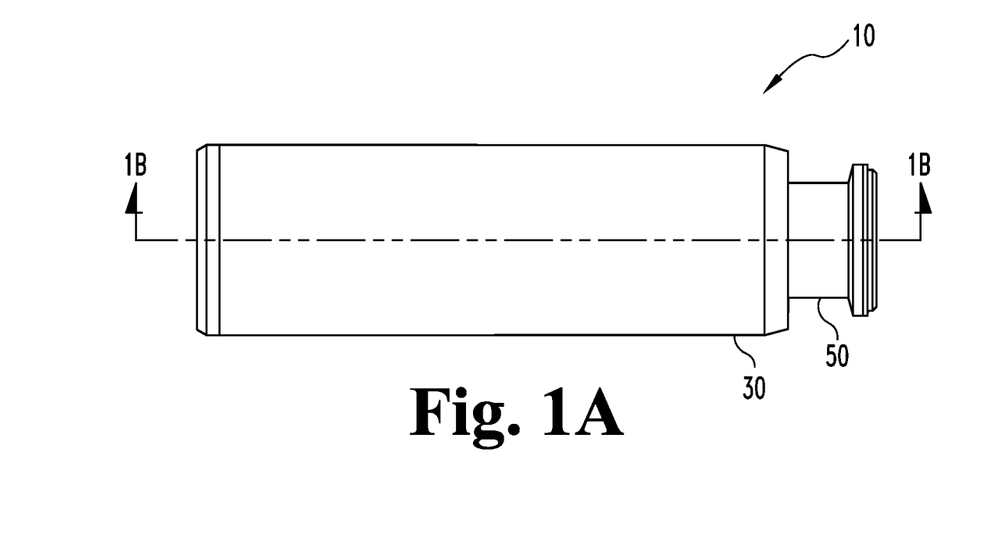
FIG. 1A is a side plan view of a cermet piston assembly according to a first embodiment of the present novel technology.
Figure 1B:
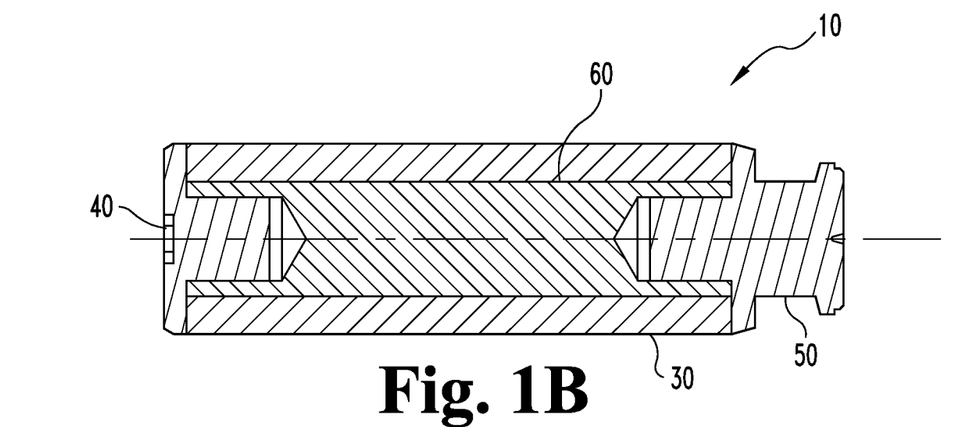
FIG. 1B is a side cutaway view of the embodiment of FIG. 1A.
Figure 1C:
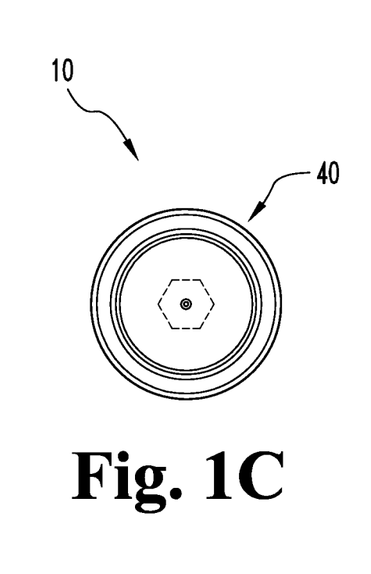
FIG. 1C is top plan view of the mandrel portion of the piston assembly embodiment of FIG. 1A.
Figure 2A:
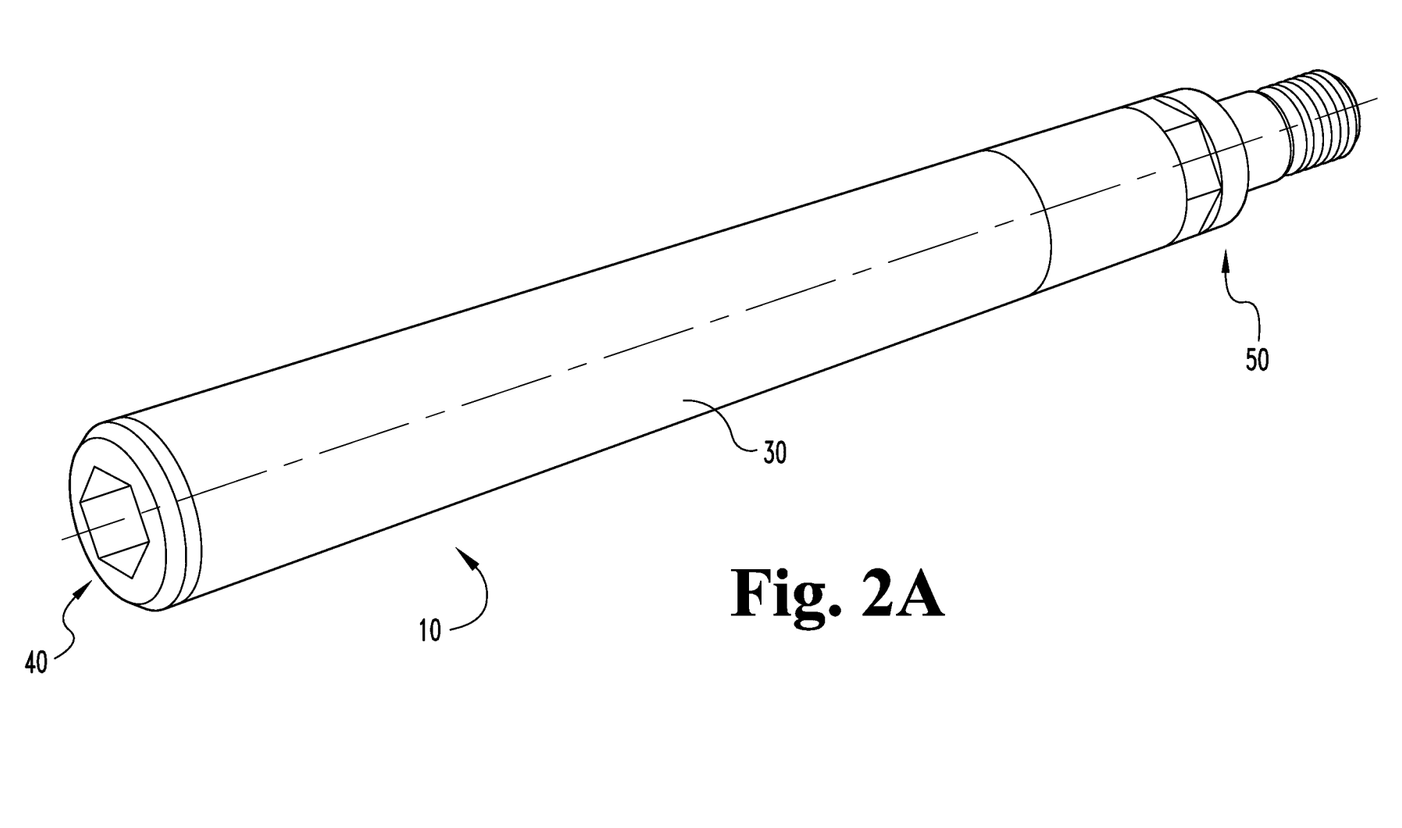
FIG. 2A is a front perspective view of the embodiment of FIG. 1A.
Figure 2B:
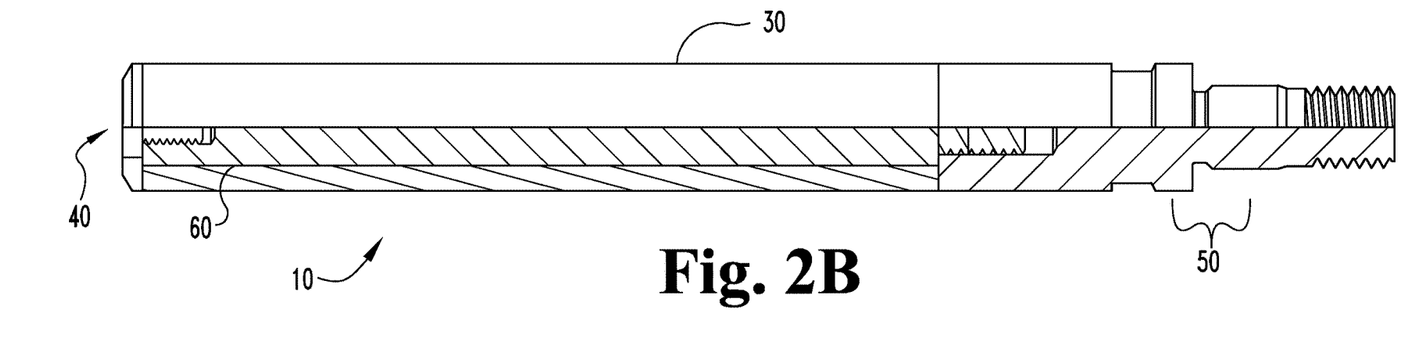
FIG. 2B is a partial side cutaway elevation view of the embodiment of FIG. 1A.
Figure 3:
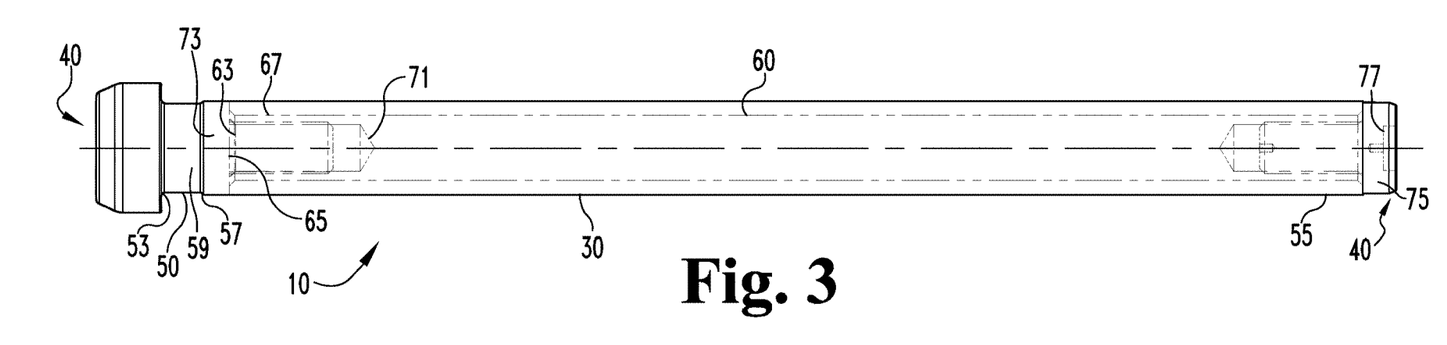
FIG. 3 is a side cutaway elevation view of the embodiment of FIG. 1A.
Figure 4:
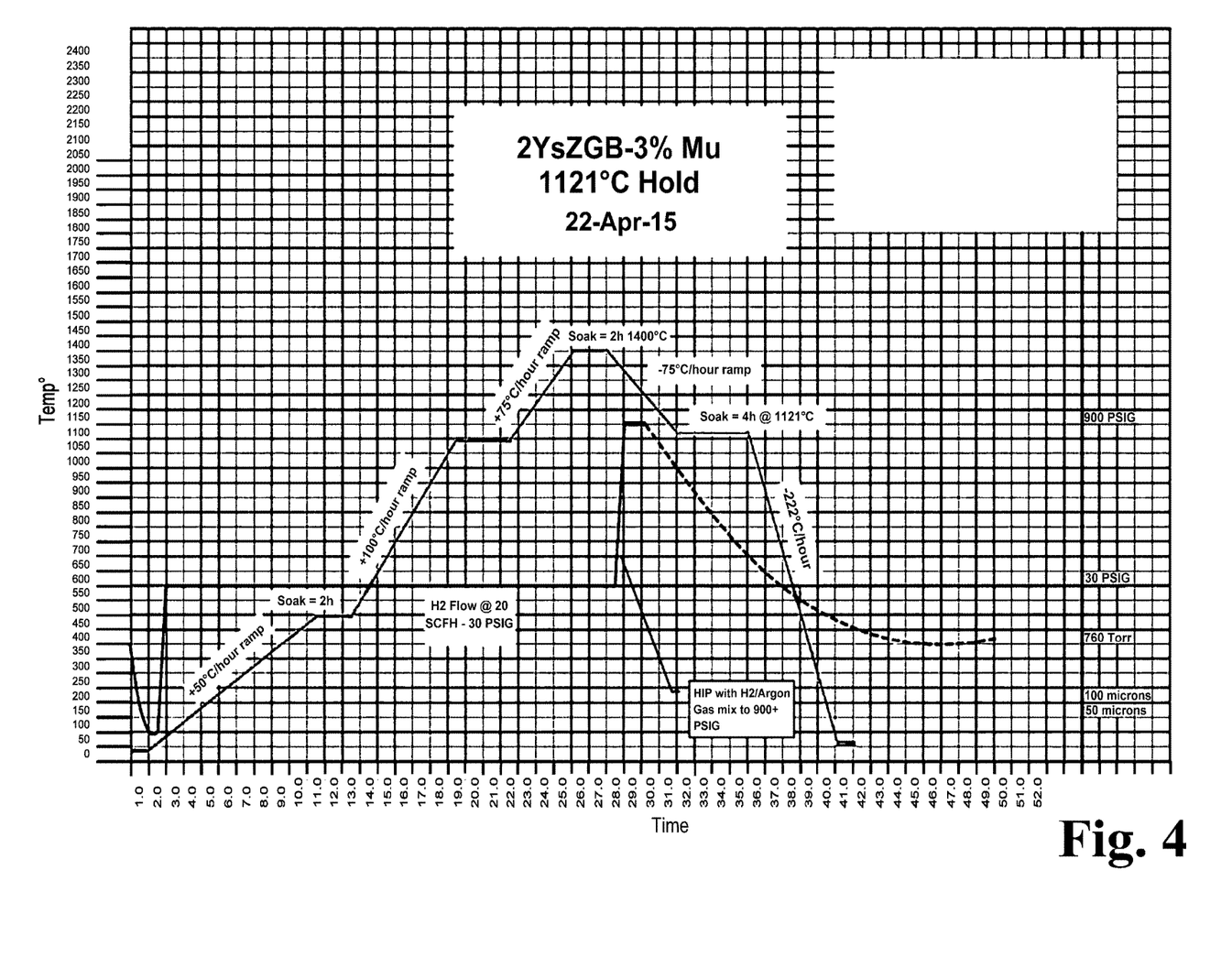
FIG. 4 schematically illustrates a typical sintering profile of the cermet material of FIG. 1A.

In some embodiments, cermet bodies of the present novel composition are produced by combining 2-8 weight percent mu-metal powder with a balance of ceramic matrix powder, such as YSZ, to yield a homogeneous admixture. The admixture is formed into a body having a desired shape by hot isostatic pressing (HIPPING) at a relatively low pressure, typically between 500 and 1000 PSI, and at temperatures in the 900° C. to 1500° C. range in a reducing environment, such as flowing dry $H_2$ or forming gas. This process yields bodies having densities of greater than 99% of theoretical (i.e., less than 1% porosity), more typically greater than 99.2% theoretically dense (less than 0.8% porosity), still more typically greater than 99.5% theoretically dense (less than 0.5% porosity); yet more typically greater than 99.9% theoretically dense (less than 0.1% porosity); and still more typically at substantially 100% theoretically dense (substantially 0% porosity). FIG. 4 illustrates a typical sintering profile.

Figure 5:
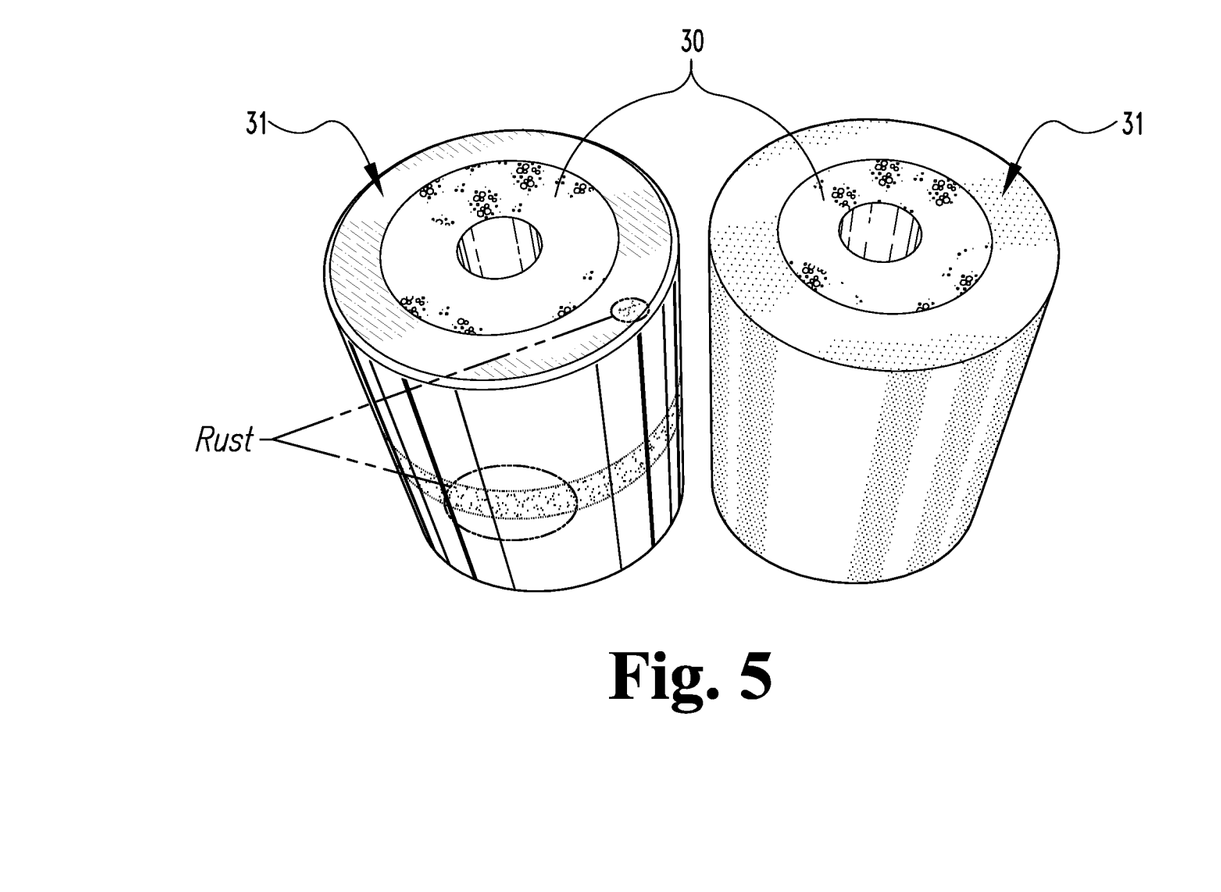
FIG. 5 is a perspective view of the piston assembly of claim 1 supported in a metal-detectible plastic belt.
Figure 6:
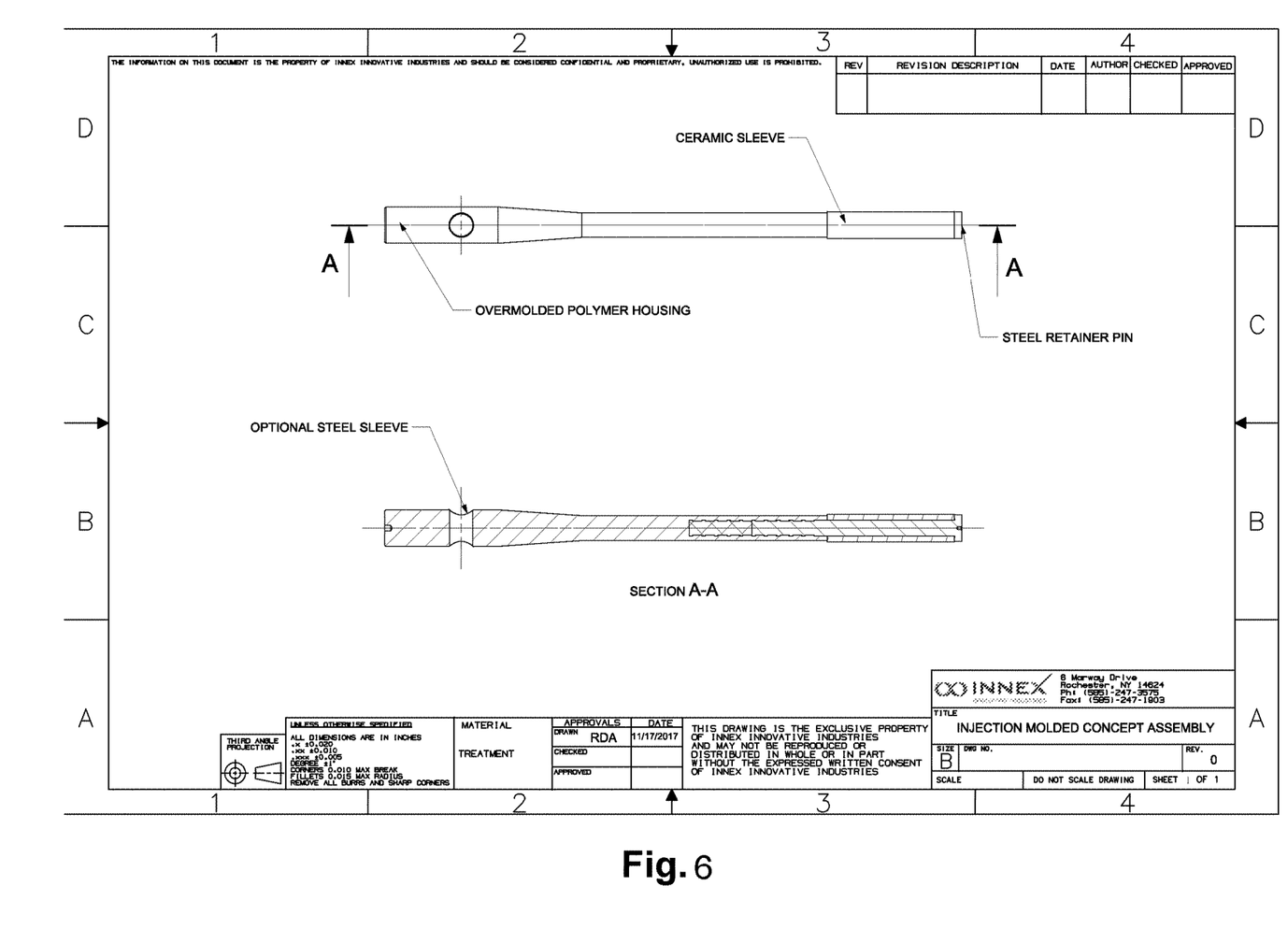
FIG. 6 is a partial cutaway exploded view of claim 5.

In some embodiments, wear sleeve 30 is surrounded by a plastic (such as high molecular mass polymers, thermoplastics, thermosetting polymers, amorphous plastics, crystalline plastics, resin-based materials, and the like) retaining belt or sleeve 31 (see FIG. 5). Retaining sleeve 31 offers compression reinforcement to the ceramic or cermet wear sleeve 30 while avoiding the potential for rust or like detritus that may form and then contaminate the pressed bodies. Retaining sleeve 31 is typically made from a plurality of plastic particles defining a plastic portion mixed with a plurality of high magnetic permeability metallic particles distributed throughout the plastic portion to define an admixture which is then pressed and formed into the retaining belt configuration. Typically, the plastic particles and the metallic particles are generally the same size and shape (typically generally spherical and about 0.3 mm or more in diameter). More typically, each respective high magnetic permeability metallic particle typically has a magnetic permeability of about 0.0001 H/m, more typically about 0.006 H/m, still more typically about 0.02 H/m. Typically, each respective high magnetic permeability metallic particle typically has a relative permeability of at least 5,000; more typically, about 8,000, still more typically about 10,000, and yet more typically about 15,000. The plastic particles are typically selected from the group consisting of high molecular mass polymers, thermoplastics, thermosetting polymers, amorphous plastics, crystalline plastics, resin-based materials, and combinations thereof.

Metal detectible plastic made from the admixture typically has a magnetic permeability of about 0.00005 H/m, more typically about 0.0005 H/m, still more typically about 0.005 H/m. Metal detectible plastic made from the admixture typically has a relative permeability of at least 5,000, more typically about 8,000, and yet more typically about 10,000. The metal detectible plastic material may be thought of as a plastic matrix portion with a plurality of high magnetic permeability metal particles suspended therein. The plastic matrix portion may include a plurality of reinforcing particles dispersed therein. The reinforcing particles may be selected from the group comprising glass, carbon nanotubes, carbon fiber, graphite, graphene, ceramic powder and combinations thereof.

In some embodiments, both the die and/or sleeve are made of (typically structurally reinforced) plastic; these dies and sleeves may be metal detectible through the inclusion of dispersed mu-metal or like materials having high magnetic permeability and/or relative permeabilities, or simply reinforced plastic. These plastic die/sleeve combinations (or dies without sleeves) may be used with cermet tooling, metal tooling, or tooling made of any suitable structural material. The plastic may be dyed to color code plastic type (reinforced, metal detectible, reinforced and metal detectible, and so forth) for ease of identification and to reduce the likelihood of using the incorrect die for a specific job.

In contrast, a steel sleeve is prone to corrosion and will eventually rust, yielding raised surface structures which both weaken the sleeve and cause friction. Such rust spots result in a buildup of powder that will require cleaning and maintenance, reduce the strength and integrity of the steel sleeve, and can be easily flaked and chipped off to result in contamination of the pressed bodies. Further, stacking tolerances make for difficulty in insertion of the wear sleeve 30 into a steel sleeve, making the product difficult to produce in a high production environment. Further, steel is very heavy, adding to shipping expense and user fatigue and injury.

A polymer or polymer composite sleeve 31 is lighter, cheaper, and easier to produce and is not prone to the flaking/powder contaminant issues inherent with rusty metal. Moreover, the insertion of the wear sleeve 30 into the plastic retaining sleeve 31 it is more forgiving, reducing the need for tight dimensional tolerances that are required for shrink fitting the ceramic in the steel housing. In most cases, the retaining sleeve 31 is molded over the ceramic or cermet piece 30. The ceramic piece 30 typically has radials or grooves pressed thereinto, allowing the plastic sleeve 31 to fill such grooves or radials and hug the ceramic/cermet body 30, thus holding the ceramic/cermet body 31 tightly.

In some embodiments, the cermet body 30 is inserted into the plastic support structure (such as a belt or sleeve) 31 via mechanical pressure and/or ultrasonic urging and/or applied heat to yield an interference fit with the cermet body 30. In other embodiments, the plastic support structure 31 is simply molded or otherwise directly formed onto the cermet body 30. Predetermined portions of the sleeve 31 may be ultrasonically or otherwise densified to increase durability. Similarly, steel or like structural inserts may be applied to enhance durability.

It should be noted that while the above contemplates a cermet piston/plunger plastic die and/or support sleeve, the above cermet and plastic materials can just as easily lend themselves to punches, dies, plungers, pistons, bushings, valves, and the like.

Example 2

YST powder was mixed with oxidized mu-metal alloy to yield a homogeneous admixture having 4 weight percent oxidized mu-metal. The powder was pressed into a green body and calcined at 600° C. for 8 hours to debind and remove the oxygen from the oxidized mu-metal. The temperature was ramped to 1400° C. and the calcined body was soaked at 1400° C. for 2 hours to sinter. The sintered body was hot isostatically pressed at 900 PSI in a reducing atmosphere (5% hydrogen gas), after which the body was annealed at 1120° C. for 4 hours, and then ramped to room temperature over 5 hours. The body had a density of substantially theoretical (in excess of 99.9 percent dense), hardness of about 1450 HV, flexural strength of about 200 kPSI, and a relative permeability $\mu/\mu_0$ of about 1000.

Example 3

YST powder was mixed with mu-metal alloy and a binder to yield a homogeneous admixture having 3 weight percent mu-metal. The admixture was heated in an oxidizing atmosphere to oxidize the mu-metal. The powder was pressed into a green body and plasma sintered at 1400° C. in a reducing atmosphere (dry $H_2$) for 10 minutes to remove binder and also the oxygen from the oxidized mu-metal and sinter the body. The sintered body was allowed to cool to room temperature with the furnace (natural cool down). The body had a density of 99.5 percent theoretical, a hardness of 1470 HV, flexural strength of 204 kPSI, and a relative permeability $\mu/\mu_0$ of 2500.

Example 4

YST powder was mixed with mu-metal alloy to yield a homogeneous admixture having 5 weight percent mu-metal. The admixture was heated in an oxidizing atmosphere to oxidize the mu-metal. The powder was pressed into a green body and plasma sintered at 1400° C. in a reducing atmosphere (dry $H_2$) for 20 minutes to remove the oxygen from the oxidized mu-metal and sinter the body. The sintered body was allowed to cool to room temperature with the furnace (natural cool down). The body had a density of 99.2 percent theoretical, a hardness of 1450 HV, flexural strength of 200 kPSI, and a relative permeability $\mu/\mu_0$ of 2500.

Example 5

YST powder may be mixed without mu-metal alloy to yield a homogeneous admixture. The admixture may be pressed into a green body and plasma sintered at 1400° C. in a reducing atmosphere (forming gas, dry $H_2$, or the like) for 10-30 minutes to sinter the body. The sintered body may be allowed to cool to room temperature with the furnace (natural cool down). The body will have a density of between about 99.2 and 99.8 percent theoretical, a hardness of about 1470 HV, a flexural strength of about 200 kPSI, and a relative permeability $\mu/\mu_0$ of between about 850 and 2500.

While the metal, typically mu-metal, composition is typically held under 20%, compositions are envisioned with sufficient metal or mu-metal phase such that the resulting sintered bodies exhibit metallic electrical conductivity. Such bodies would have contiguity or quasi-contiguity of the metallic phase, and would be able to participate in screening of electromagnetic energy. For example, a functioning Faraday cage may be constructed of high-metal phase cermet pieces.

Bodies formed as described above, particularly those sintered in hydrogen, exhibit the characteristics of having smooth and quasi-polished or polishable surfaces, require substantially less lubrication than metal counterparts, wear evenly with substantially reduced chipping and pitting (than metal or conventional YSZ counterparts). Tooling for pressing pills benefits from high wear resistance, reduced pitting, chipping and rut erosion, reducing and/or eliminating retention of surface material and potential for bacterial contamination.

In one embodiment, the compaction die is utilized on a tablet press and filled with powder with scraper blade and suction from lower punch. Upper and lower punches or like structures may tamp the powder in the die to yield a green body, after which the lower punch lifts and ejects the tablet or body from the compaction die. The parameters of this process are varied (fine-tuned) depending on the equipment and desired finished product.

In the prior art, the compaction die is typically inserted into and supported by a steel retaining belt or ring, the belt having been cut and machined to yield an inner diameter (ID) dimension having very tight tolerance and having a very smooth machined and symmetrical surface. The ceramic or cermet sleeve is also formed to have a very specific outer diameter (OD) dimension with a smooth surface. The metal is then heated and expands, and at this time the ceramic sleeve is inserted in the steel belt or housing (shrink fit). The inside dimension in the ceramic can be core drilled prior to the shrink fit or after. If done before or after the ceramic may crack due to the pressure from the metal shrinking tightly around the ceramic. The required force to hold the ceramic varies per industry. Final machining is then required to remove excess metal and ceramic and bring the die assembly to customer specification. Stacking tolerances and proper surface parameters make this product difficult to manufacture in a high production environment. Another drawback of the prior technology is that the steel is reactive and typically develops rust spots, which manifest as raised surface features and thus have the potential to cause friction. This typically gives rise to a buildup of powder, and increases the need for frequent cleaning and maintenance. The rust also reduces the strength and integrity of the die, is easily chipped, and causes contamination. In addition, the steel banding makes the die assembly very heavy for both the operator to use and the manufacturer to ship.

In operation of this embodiment, a cermet die assembly is inserted into and supported by a polymeric or plastic housing. The insertion process is much more forgiving and reduces the need for tight specifications for shrink fitting the ceramic or cermet die assembly into the housing. The cermet die assembly requires less stringent dimensional tolerances (i.e., bigger window) as the plastic support belt or housing may be directly molded over or onto the ceramic. The ceramic or cermet die assembly typically includes radials or groves formed thereinto for engaging the plastic housing so that the housing "hugs" the cermet die assembly for a glove-like fit. Production time and difficulty are both reduced, thus reducing the per-part cost as well. The product failure or reject rate is likewise reduced significantly, along with the risk of catastrophic failure when the die assembly is in use. Further, the weight of the supported cermet die assembly reduced to about one-half, more typically to about one-third, of that of its steel banded counterpart.

In many embodiments, the cermet material is sufficiently electrically conductive that the cermet bodies may be machined via electric discharge machining (EDM) techniques with high precision and at room temperature. EDM machinability is significantly quicker and less expensive than traditional grinding techniques for yielding high-precision ceramic workpieces. In particular, wire-cut EDM techniques may be applied to yield intricate features in the cermet body.

The relatively high, metallic or quasi-metallic electrical conductivity iparted by the electrically conductive additive particles (metal, graphene, or like highly conductive materials) of the cermet powders and green/calcined/sintered bodies makes them uniquely qualified for service as both EMF and physical or structural shielding for electronic devices, personal use (such as EMF filtering earplugs or helmets), and the like. Further, the material may have an electrically insulating surface or portion when combined with a layer of insulating material, such as alumina or mullite. Such bodies could be formed as unitary pieces or as multipiece composites.

Additionally, the composite composition may include such reinforcing and toughening materials as graphene, graphite, silicon nitride, SiC, and combinations thereof, or the like, typically added as powders, and more typically added in fibrous form. The addition of graphene and/or graphite typically imparts a slick surface finish that may be described as nearly self-lubricating The sintered, EDM-friendly body will typically have a density of substantially theoretical (in excess of 99 percent, more typically in excess of 99.9 percent dense), bulk density of about 6.1 g/cc, hardness of about 1150-1250 HV, flexural strength of at least about 200 kPSI, compressive strength of about 2000 kPSI, toughness of 10-14 MPa·m$^{1/2}$ (K1c), modulus of 270-290 GPa, and a relative permeability $\mu/\mu_0$ of about 1000.

It should be noted that the mechanism for attaining sufficient electrical conduction for EDM machining is as yet unresolved. While it is assumed that the metallic and/or conducting nonmetallic particles are organized to yield contiguous electrical conduction paths throughout the cermet bodies, such paths have yet to be observed directly. For example, the grain boundaries of the cermet may be highly electrically conductive in the 'metallic conductor' range, which the grains themselves exhibit electrically insulating properties. It is known through experimental data that homogeneous mixtures of ceramic powders with conductive additives that are formed into bodies and calcined and/or sintered in inert and/or reducing atmospheres as disclosed herein yield densified cermet bodies that are EDM machinable.

Green bodies formed from cermet powder precursors via CIP, HIP, hot pressing, injection molding, casting or like processes may be formed to near-net shapes, often without the need for binders. These green (and typically binder-free) bodies may be precision machined into complex shapes as green bodies, calcined bodies or fully dense sintered bodies via EDM machining, taking advantage of both the toughness and hardness of the cermet materials and their bulk electrical conductivity for precision machining and polishing. The lack of a binder requirement likewise typically reduces both shrinkage and calcination/sintering cycle time.

Example 6

YST powder (65 volume percent) was mixed with 30 volume percent TiN powder to provide a conductive phase, and 5 volume percent mu-metal alloy to yield a homogeneous admixture. The admixture was be hot pressed at 1450° C. for 30 minutes at 20 MPa in a reducing atmosphere (dry $H_2$) to yield a sintered body. The sintered body was allowed to cool to room temperature with the furnace (natural cool down). The body had a density of between about 100 percent theoretical (5.90 g/cc), a hardness of about 1245 HV, a flexural strength of about 275 kPSI, and a fracture toughness of about 8.5 MPa·m$^{1/2}$. The sintered body was EDM machinable with a cutting speed of 3.6 mm/minute.

Example 7

YST powder (68.5 volume percent) was mixed with 20 volume percent TiN powder to provide a conductive phase, 10 volume percent ferrite and 1.5 volume percent graphene to yield a homogeneous admixture. The admixture was be hot pressed at 1450° C. for 30 minutes at 20 MPa in a reducing atmosphere (dry $H_2$) to yield a sintered body. The sintered body was allowed to cool to room temperature with the furnace (natural cool down). The body had a density of between about 100 percent theoretical (5.63 g/cc), a hardness of about 1275 HV, a flexural strength of about 290 kPSI, and a fracture toughness of about 5.0 MPa·m$^{1/2}$. The sintered body was EDM machinable with a cutting speed of 4.8 mm/minute.

Example 8

YST powder (57 volume percent) was mixed with 30 volume percent TiN powder to provide a conductive phase, 10 volume percent ferrite and 3 volume percent graphene to yield a homogeneous admixture. The admixture was be hot pressed at 1450° C. for 30 minutes at 20 MPa in a reducing atmosphere (dry $H_2$) to yield a sintered body. The sintered body was allowed to cool to room temperature with the furnace (natural cool down). The body had a density of between about 100 percent theoretical (5.58 g/cc), a hardness of about 1130 HV, a flexural strength of about 245 kPSI, and a fracture toughness of about 6.3 MPa·m$^{1/2}$. The sintered body was EDM machinable with a cutting speed of 4.8 mm/minute.

Example 9

YST powder (45 volume percent) was mixed with 40 volume percent TiN powder to provide a conductive phase, 10 volume percent ferrite and 5 volume percent graphene to yield a homogeneous admixture. The admixture was be hot pressed at 1450° C. for 30 minutes at 20 MPa in a reducing atmosphere (dry $H_2$) to yield a sintered body. The sintered body was allowed to cool to room temperature with the furnace (natural cool down). The body had a density of between about 100 percent theoretical (5.51 g/cc), a hardness of about 950 HV, a flexural strength of about 160 kPSI, and a fracture toughness of about 6.5 MPa·m$^{1/2}$. The sintered body was EDM machinable with a cutting speed of 4.8 mm/minute.

The cermet bodies incorporating graphene additives tend to have slick, smooth surfaces that require little to no externally applied lubricant, giving punches and dies the advantage of requiring less, if any, lubricant that might otherwise contaminate powders and green bodies, as well as reducing the tendency of powders to stick to punch and die surfaces. Cermet tools thus require less frequent maintenance than do steel counterparts. Moreover, cermet bodies made of precursor admixtures containing 20 volume percent or more graphene (such as 25 volume percent or 30 volume percent) enjoy the benefits of toughening and high 'metallic' electrical conductivity, typically at the expense of hardness and/or strength. Metallic conductivity is often achieved with a combination of graphene and other additives, such as TiN, to tailor the strength, toughness, hardness, and electrical conductivity properties of the resultant cermet.

Metal leaching tests have yielded results indicating that the novel cermet material loses substantially less metal than tool steel under ASTM Method C738-94 test conditions.

TABLE 1

| YSZ body |
| --- |
| Ni: 0.00 ng Ni/mm$^2$ |
| Fe: 0.04 ng Fe/mm$^2$ |
| Mu-metal Cermet body |
| Ni: 1 ng Ni/mm$^2$ |
| Fe: 1 ng Fe/mm$^2$ |
| Tool Steel body |
| Ni: 30 ng Ni/mm$^2$ |
| Fe: 70 ng Fe/mm$^2$ |

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A tooling assembly, comprising:
   a cermet tooling body; and
   a plastic support structure operationally connected to the cermet tooling body;
   wherein the plastic support structure at least partially encapsulates the cermet tooling body;
   wherein the plastic support structure includes a plastic matrix portion and a plurality of high magnetic permeability metallic particles distributed throughout the plastic matrix portion;
   wherein each respective high magnetic permeability metallic particle has a magnetic permeability of at least 0.0001 H/m;
   wherein each respective high magnetic permeability metallic particle has a relative magnetic permeability of about 8000; and
   wherein the plastic matrix portion is selected from the group consisting of high molecular mass polymers, thermoplastics, thermosetting polymers, amorphous plastics, crystalline plastics, resin-based materials, and combinations thereof.

2. The tooling assembly of claim 1 wherein the plastic support structure is molded onto the cermet tooling body.

3. The tooling assembly of claim 1 wherein the plastic support structure engages the cermet tooling body in an interference fit.

4. A tooling assembly, comprising:
   a cermet tooling body; and
   a plastic support structure operationally connected to the cermet tooling body;
   wherein the plastic support structure at least partially encapsulates the cermet tooling body;
   wherein the plastic support structure includes a plastic matrix portion and a plurality of high magnetic permeability metallic particles distributed throughout the plastic matrix portion;
   wherein each respective high magnetic permeability metallic particle has a magnetic permeability of at least 0.0001 H/m;
   wherein each respective high magnetic permeability metallic particle has a relative magnetic permeability of about 8000; and
   wherein the plastic matrix portion is selected from the group consisting of high molecular mass polymers, thermoplastics, thermosetting polymers, amorphous plastics, crystalline plastics, resin-based materials, and combinations thereof; and
   wherein the cermet tooling body is a die and wherein the plastic support structure is a belt.

5. The tooling assembly of claim 1 wherein the cermet tooling body is grooved and wherein the plastic support structure fills the respective grooves.

6. The tooling assembly of claim 1 wherein the cermet body further comprises:
   a ceramic portion;
   a plurality of high magnetic permeability particles distributed throughout the ceramic portion, wherein each high magnetic permeability particle has a magnetic permeability of at least 0.01 H/m and a relative permeability of at least 50,000; and
   wherein the cermet body is machinable via electrical discharge machining.

7. The tooling assembly of claim 1 wherein the cermet body further comprises:
   a ceramic portion;
   a plurality of electrically conductive particles distributed throughout the ceramic portion; and
   wherein the cermet body is machinable via electrical discharge machining.

8. The tooling assembly of claim 7 wherein the ceramic portion is toughened with graphene present in from 1.5 to 25 volume percent.

9. The tooling assembly of claim 8 wherein the ceramic portion is EDM machinable.

* * * * *